US009994945B2

(12) United States Patent
Yoshida et al.

(10) Patent No.: US 9,994,945 B2
(45) Date of Patent: Jun. 12, 2018

(54) ALUMINUM ALLOY WIRE ROD, ALUMINUM ALLOY STRANDED WIRE, COVERED WIRE, WIRE HARNESS, AND METHOD OF MANUFACTURING ALUMINUM ALLOY WIRE ROD

(71) Applicants: FURUKAWA ELECTRIC CO., LTD., Tokyo (JP); FURUKAWA AUTOMOTIVE SYSTEMS INC., Inukami-gun, Shiga (JP)

(72) Inventors: Sho Yoshida, Tokyo (JP); Shigeki Sekiya, Tokyo (JP); Kengo Mitose, Tokyo (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days. days.

(21) Appl. No.: 15/599,658

(22) Filed: May 19, 2017

(65) Prior Publication Data

US 2017/0253954 A1 Sep. 7, 2017

Related U.S. Application Data

(63) Continuation of application No. PCT/JP2015/084197, filed on Dec. 4, 2015.

(30) Foreign Application Priority Data

Dec. 5, 2014 (JP) ................................ 2014-247456

(51) Int. Cl.
*H01R 9/05* (2006.01)
*H02G 15/04* (2006.01)
(Continued)

(52) U.S. Cl.
CPC ................ *C22F 1/04* (2013.01); *C22C 21/02* (2013.01); *C22F 1/00* (2013.01); *C22F 1/043* (2013.01);
(Continued)

(58) Field of Classification Search
CPC .. B21C 1/00; B21C 9/00; C22C 21/00; C22C 21/02; C22C 21/04; C22C 21/08;
(Continued)

(56) References Cited

U.S. PATENT DOCUMENTS 9,263,167 B2 2/2016 Yoshida et al.
2004/0256218 A1* 12/2004 Glass ................... C23C 14/165 428/692.1
(Continued)

FOREIGN PATENT DOCUMENTS

JP 2004-134212 A 4/2004
JP 2010036237 A * 2/2010 ............ H01B 13/00
(Continued)

OTHER PUBLICATIONS

International Search Report for PCT/JP2015/084197 (PCT/ISA/210) dated Mar. 8, 2016.
(Continued)

*Primary Examiner* — Timothy Thompson
*Assistant Examiner* — Guillermo Egoavil
(74) *Attorney, Agent, or Firm* — Birch, Stewart, Kolasch & Birch, LLP

(57) ABSTRACT

An aluminum alloy wire rod includes Mg: 0.1-1.0 mass %, Si: 0.1-1.2 mass %, Fe: 0.10-1.40 mass %, Ti: 0-0.100 mass %, B: 0-0.030 mass %, Cu: 0-1.00 mass %, Ag: 0-0.50 mass %, Au: 0-0.50 mass %, Mn: 0-1.00 mass %, Cr: 0-1.00 mass %, Zr: 0-0.50 mass %, Hf: 0-0.50 mass %, V: 0-0.50 mass %, Sc: 0-0.50 mass %, Co: 0-0.50 mass %, Ni: 0-0.50 mass %, and the balance: Al and inevitable impurities. In a cross
(Continued)

section parallel to a wire rod lengthwise direction and including a center line of the wire rod, no void having an area greater than 20 μm$^2$ is present, or even in a case where at least one void having an area greater than 20 μm$^2$ is present, a presence ratio of the at least one void per 1000 μm$^2$ is on average in a range of less than or equal to one void/1000 μm$^2$.

17 Claims, 5 Drawing Sheets

(51) Int. Cl.

| | |
|---|---|
| ***H02G 15/013*** | (2006.01) |
| ***C22F 1/04*** | (2006.01) |
| ***C22C 21/02*** | (2006.01) |
| ***C22F 1/043*** | (2006.01) |
| ***H01B 1/02*** | (2006.01) |
| ***H01B 13/00*** | (2006.01) |
| ***C22F 1/00*** | (2006.01) |
| ***H01B 5/02*** | (2006.01) |
| ***H01B 5/08*** | (2006.01) |
| ***H01B 7/00*** | (2006.01) |
| ***H01B 7/02*** | (2006.01) |
| ***H01R 11/11*** | (2006.01) |

(52) U.S. Cl.
CPC ............... *H01B 1/023* (2013.01); *H01B 5/02* (2013.01); *H01B 5/08* (2013.01); *H01B 7/0045* (2013.01); *H01B 7/02* (2013.01); *H01B 13/0016* (2013.01); *H01B 13/0036* (2013.01); *H01R 11/11* (2013.01)

(58) Field of Classification Search
CPC ...... C22F 1/00; C22F 1/04; C22F 1/05; C22F 1/043; C22F 1/047; C23C 14/165; C23C 14/3414; C23C 14/5853; H01B 1/02; H01B 1/023; H01B 3/30; H01B 5/02; H01B 5/08; H01B 7/00; H01B 7/02; H01B 7/14; H01B 7/0045; H01B 9/006; H01B 13/00; H01B 13/0006; H01B 13/0016; H01B 13/0036; H01R 11/11; H02G 9/00; Y10T 428/32
USPC ............... 174/37, 72 A, 74 R, 130; 420/528; 428/692.1
See application file for complete search history.

(56) References Cited

U.S. PATENT DOCUMENTS

| | | | |
|---|---|---|---|
| 2013/0264115 A1 | 10/2013 | Kobayashi et al. | |
| 2013/0284481 A1* | 10/2013 | Miramonti ............. | H01B 9/006 174/37 |
| 2015/0213913 A1 | 7/2015 | Yoshida et al. | |
| 2015/0235729 A1 | 8/2015 | Yoshida et al. | |

FOREIGN PATENT DOCUMENTS

| | | |
|---|---|---|
| JP | 5607853 B1 | 10/2014 |
| WO | WO 2012/141041 A1 | 10/2012 |
| WO | WO 2014/155820 A1 | 10/2014 |

OTHER PUBLICATIONS

Written Opinion of the International Searching Authority for PCT/JP2015/084197 (PCT/ISA/237) dated Mar. 8, 2016.
English translation of Written Opinion of the International Searching Authority; International Preliminary Report on Patentability, dated Mar. 8, 2016, issued in PCT/JP2015/084197 (Forms PCT/ISA/237 and PCT/IB/373).

* cited by examiner

ALUMINUM ALLOY WIRE ROD, ALUMINUM ALLOY STRANDED WIRE, COVERED WIRE, WIRE HARNESS, AND METHOD OF MANUFACTURING ALUMINUM ALLOY WIRE ROD

CROSS REFERENCE TO RELATED APPLICATIONS

This is a continuation application of International Patent Application No. PCT/JP2015/084197 filed Dec. 4, 2015, which claims the benefit of Japanese Patent Application No. 2014-247456, filed Dec. 5, 2014, the full contents of all of which are hereby incorporated by reference in their entirety.

BACKGROUND

Technical Field

The present disclosure relates to an aluminum alloy wire rod used as a conductor of an electric wiring structure, an aluminum alloy stranded wire, a covered wire, a wire harness and a method of manufacturing an aluminum alloy wire rod.

Background Art

In the related art, a so-called wire harness has been used as an electric wiring structure for transportation vehicles such as automobiles, trains, and aircrafts, or an electric wiring structure for industrial robots. The wire harness is a member including electric wires each having a conductor made of copper or copper alloy and fitted with terminals (connectors) made of copper or copper alloy (e.g., brass). With recent rapid advancements in performances and functions of automobiles, various electrical devices and control devices installed in vehicles tend to increase in number and electric wiring structures used for these devices also tend to increase in number. On the other hand, for environmental friendliness, lightweighting of transportation vehicles is strongly desired for improving fuel efficiency of transportation vehicles such as automobiles.

As one of the measures for achieving lightweighting of transportation vehicles, there have been, for example, continuous efforts in the studies of using aluminum or aluminum alloys as a conductor of an electric wiring structure, which is more lightweight, instead of conventionally used copper or copper alloys. Since aluminum has a specific gravity of about one-third of a specific gravity of copper and has a conductivity of about two-thirds of a conductivity of copper (in a case where pure copper is a standard for 100% IACS, pure aluminum has approximately 66% IACS), an aluminum conductor wire rod needs to have a cross sectional area of approximately 1.5 times greater than that of a copper conductor wire rod to allow the same electric current as the electric current flowing through the copper conductor wire rod to flow through the pure aluminum conductor wire rod. Even an aluminum conductor wire rod having an increased cross section as described above is used, using an aluminum conductor wire rod is advantageous from the viewpoint of lightweighting, since an aluminum conductor wire rod has a mass of about half the mass of a pure copper conductor wire rod. It is to be noted that "% IACS" represents a conductivity when a resistivity $1.7241\times10^{-8}$ Ωm of International Annealed Copper Standard is taken as 100% IACS.

However, a pure aluminum wire rod, typically an aluminum alloy wire rod for transmission lines (JIS (Japanese Industrial Standard) A1060 and A1070), is generally known for being poor in its tensile strength, resistance to impact, and bending fatigue characteristics. Therefore, for example, a pure aluminum wire rod cannot withstand a load abruptly applied by an operator or an industrial device while being installed to a car body, a tension at a crimp portion of a connecting portion between an electric wire and a terminal, and a bending fatigue loaded at a bending portion such as a door portion. On the other hand, when an alloyed wire rod containing various additive elements added thereto is used, an increased tensile strength and enhanced bending fatigue characteristics can be achieved, but there has been a problem that a conductivity may decrease due to a solid solution phenomenon of the additive elements into aluminum, and because of hardening, an ease of routing and handling in attaching a wire harness may decrease, which may decrease the productivity. Therefore, the additive elements are limited or selected within ranges which would not decrease the conductivity, and it is further necessary to provide the bending fatigue characteristics and the flexibility simultaneously.

For example, aluminum alloy wire rods containing Mg and Si are known as high strength aluminum alloy wire rods. A typical example of this aluminum alloy wire rod is a 6000 series aluminum alloy (Al—Mg—Si based alloy) wire rod. Generally, the strength of the 6000 series aluminum alloy wire rod can be increased by applying a solution treatment and an aging treatment. However, when manufacturing an extra fine wire such as a wire having a wire size of less than or equal to 0.5 mm using a 6000 series aluminum alloy wire rod, although a high conductivity and high bending fatigue characteristics can be achieved by applying a solution treatment and an aging treatment, a yield strength (0.2% yield strength) increases and a large force is required for plastic deformation, and thus there is a tendency that a work efficiency of installation to a car body decreases.

A conventional 6000-series aluminum alloy wire used for an electric wiring structure of a mobile body is described, for example, in Japanese Patent No. 5607853. Japanese Patent No. 5607853 is document of a patent based on a patent application filed by the present inventors on the basis of the results of the research and development performed by the present inventors, wherein average crystal grain sizes at the outer periphery and at the interior of a wire rod are defined, and while maintaining the extensibility and conductivity higher than or equivalent to those of the related art products, an appropriate yield strength and a high bending fatigue resistance are achieved simultaneously.

However, when an aluminum alloy wire rod is used at a position to which vibration from an engine portion including an engine is applied or in the vicinity of such a position, a high vibration resistance is required. On the other hand, when an aluminum alloy wire rod is used at a door portion, a bending operation is repeatedly applied to the aluminum alloy wire rod due to the opening and closing of the door, and accordingly a flexibility (flex resistance) is required. Since the bending in the door portion and the vibration of the engine portion give different strains to the aluminum wire rod, in order to use an aluminum alloy wire rod at both of these portions, the aluminum alloy wire rod is required to have characteristics capable of sufficiently withstanding at least these two types of strains, and thus further studies of the alloy composition and the alloy structure were necessary. Japanese Patent No. 5607853 is an invention in which the peripheral grain size is refined and preferentially precipitated at the periphery in order to strengthen the surface layer of a wire rod, and the temperature history until the solution formation and the production conditions of the line tension in a wire drawing step are not taken into consideration, and no control has been performed with respect to voids and an Fe-based crystallized material in the aluminum alloy wire rod.

The present disclosure is related to providing an aluminum alloy wire rod capable of achieving both a high vibration resistance property and a high bending fatigue resistance property while ensuring a high conductivity and an moderately low yield strength even when used as an extra fine wire (for example, the strand diameter is less than or equal to 0.5 mm), an aluminum alloy stranded wire, a covered wire and a wire harness, and to provide a method of manufacturing such an aluminum alloy wire rod.

The present inventors have found that, in the precipitation type Al—Mg—Si based alloys with which a high strength and a high conductivity can be obtained, which have hitherto been continuously studied, voids present in a matrix accelerate propagation of cracks generated by vibration, and the propagation of cracks causes shortening of the use-life. The present inventors have also found that due to a frictional force (drawing force) in the die during wire drawing, voids tend to be generated particularly around coarse Fe-based compound particles. In addition, it has been found that in a usual mass production process, the wire drawing is performed continuously by using 10 to 20 dies, and accordingly all the frictional forces are concentrated in the wire rod immediately before winding up. In contrast to this, it has been found that the stress loaded on the wire rod can be decreased by limiting the number of dies used near the final wire size or by arranging, between dies, a pulley to decrease a line tension. Also, if all the line tensions are decreased, the mass productivity will greatly decrease. Accordingly, a method has been found in which the line tensions only in vicinity of the final wire size, at which an effect is significant, are decreased. It has also been found that the Fe-based compound particles can be refined by increasing the casting cooling rate in order to decrease coarse Fe-based compound particles, and by shortening other heat treatment times. However, when refinement of the Fe-based compound particles is performed excessively, an effect of suppressing the coarsening of crystal grains of the alloy is lost to some extent. Accordingly, the additive components of the alloy and the manufacturing process have been studied again to find a method with which both the generation of voids and the coarsening of the crystal grains can be suppressed, and thus the present disclosure has been completed.

SUMMARY

According to a first aspect of the present disclosure, an aluminum alloy wire rod includes Mg: 0.1 mass % to 1.0 mass %, Si: 0.1 mass % to 1.2 mass %, Fe: 0.10 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities, wherein in a cross section parallel to a wire rod lengthwise direction and including a center line of the wire rod, no void having an area greater than 20 $\mu m^2$ is present, or even in a case where at least one void having an area greater than 20 $\mu m^2$ is present, a presence ratio of the at least one void per 1000 $\mu m^2$ is on average in a range of less than or equal to one void/1000 $\mu m^2$.

According to a second aspect of the present disclosure, a wire harness includes a covered wire including a covering layer at an outer periphery of one of the aluminum alloy wire rod and an aluminum alloy stranded wire; and a terminal fitted at an end portion of the covered wire, the covering layer being removed from the end portion, wherein the aluminum alloy wire rod comprises Mg: 0.1 mass % to 1.0 mass %, Si: 0.1 mass % to 1.2 mass %, Fe: 0.10 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities, wherein in a cross section parallel to a wire rod lengthwise direction and including a center line of the wire rod, no void having an area greater than 20 $\mu m^2$ is present, or even in a case where at least one void having an area greater than 20 $\mu m^2$ is present, a presence ratio of the at least one void per 1000 $\mu m^2$ is on average in a range of less than or equal to one void/1000 $\mu m^2$.

According to a third aspect of the present disclosure, a method of manufacturing an aluminum alloy wire rod includes forming a drawing stock through hot working subsequent to melting and casting an aluminum alloy material having a composition consisting of or comprising Mg: 0.1 mass % to 1.0 mass %, Si: 0.1 mass % to 1.2 mass %, Fe: 0.10 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities; subsequently, performing steps including at least a wire drawing step, a solution heat treatment and an aging heat treatment, wherein in the wire drawing step, wire drawing is performed with a maximum line tension of 50 N or less until a wire size of the wire rod reaches a final wire size from a wire size of twice the final wire size to the final wire size; the solution heat treatment includes heating at a predetermined temperature in a range of 450° C. to 580° C., retaining at the predetermined temperature for a predetermined time, and thereafter cooling at an average cooling rate of greater than or equal to 10° C./s to at least a temperature of 150° C.; and the aging heat treatment includes heating at a predetermined temperature of 20° C. to 250° C.

Note that, among the elements for which a range of content is specified in the aforementioned chemical composition, each of those elements for which a lower limit value of the range of content is described as "0 mass %" is a selective additive element that is optionally added as required. In other words, when a predetermined additive element is indicated as "0 mass %", it means that such an additive element is not contained.

The aluminum alloy wire rod of the present disclosure is a wire rod capable of achieving a high strength and a high conductivity even in the case of a small-diameter wire, and is flexible and easy in handling, and high both in the bending fatigue resistance property and in the vibration resistance. Accordingly, the aluminum alloy wire rod of the present disclosure can be installed at positions where different strains are applied such as the door bending portion and the engine portion, thus making it unnecessary to prepare a plurality of wire rods different from each other in characteristics and allowing a single type of wire rod to have both of the above-described properties, and is useful as a battery cable, a harness, a conduction wire for a motor, or a wiring structure of an industrial robot.

BRIEF DESCRIPTION OF DRAWINGS

FIGS. 1A and 1B are schematic diagrams illustrating a wire drawing process during production of an aluminum alloy wire rod according to an embodiment of the present disclosure, wherein FIG. 1A illustrates a conventional wire drawing process, and FIG. 1B illustrates the wire drawing process of the present disclosure.

FIGS. 2A and 2B are cross-sectional images obtained by photographing a cross section parallel to the lengthwise direction of the wire rod of an aluminum alloy wire rod produced by a conventional method with a scanning electron microscope (SEM), wherein FIG. 2A shows a photograph taken at a magnification of 1000× and FIG. 2B shows a photograph taken at a magnification of 5000×.

DETAILED DESCRIPTION

Figure 1A:
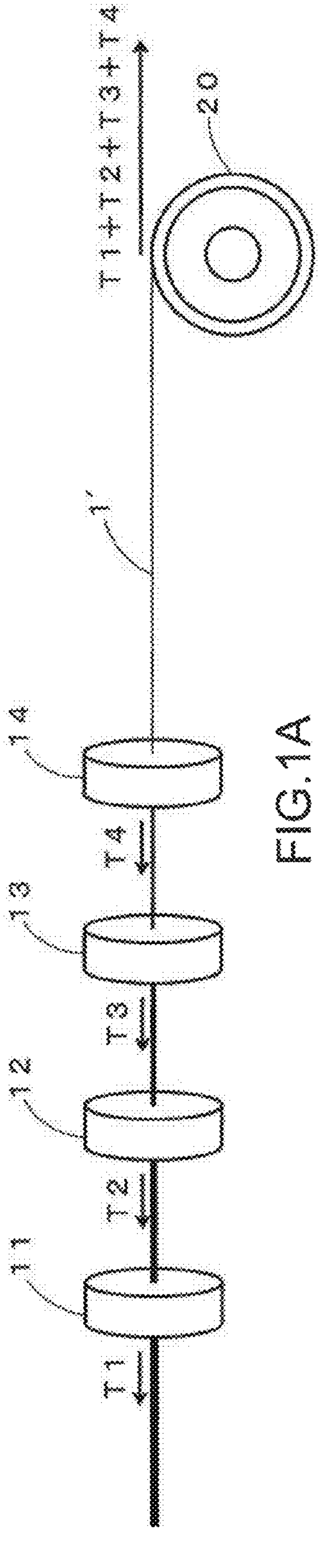

Further features of the present disclosure will become apparent from the following detailed description of exemplary embodiments with reference to the accompanying drawings. Also, hereinafter, reasons for limiting the chemical compositions or the like of the present disclosure will be described.

(1) Chemical Composition

<Mg: 0.1 Mass % to 1.0 Mass %>

Mg (magnesium) has an effect of strengthening by forming a solid solution in an aluminum matrix, and a part of it has an effect of improving tensile strength by being precipitated as a β-phase (beta double prime phase) or the like together with Si. In a case where it forms an Mg—Si cluster as a solute atom cluster, it is an element having an effect of improving a tensile strength and an elongation. However, in a case where Mg content is less than 0.10 mass %, the above effects are insufficient. In a case where Mg content is in excess of 1.00 mass %, there is an increased possibility of formation of an Mg-concentration part on a grain boundary, which may cause a decrease in tensile strength and elongation. In addition, due to an increased amount of Mg element forming the solid solution, the 0.2% yield strength is increased, the ease of routing and handling of an electric wire is decreased, and the conductivity is also decreased. Accordingly, the Mg content is 0.1 mass % to 1.0 mass %. The Mg content is, when a high strength is of importance, preferably 0.5 mass % to 1.0 mass %, and when a conductivity is of importance, preferably greater than or equal to 0.1 mass % and less than 0.5 mass %. Based on the points described above, the content of Mg is generally preferably 0.3 mass % to 0.7 mass %.

<Si: 0.1 Mass % to 1.2 Mass %>

Si (silicon) has an effect of strengthening by forming a solid solution in an aluminum matrix, and a part of it has an effect of improving tensile strength and a bending fatigue resistance by being precipitated as a β-phase (beta double prime phase) or the like together with Mg. Also, in a case where it forms an Mg—Si cluster or a Si—Si cluster as a solute atom cluster, it is an element having an effect of improving a tensile strength and an elongation. However, in a case where Si content is less than 0.1 mass %, the above effects are insufficient. In a case where Si content is in excess of 1.2 mass %, there is an increased possibility of formation of an Si-concentration part on a grain boundary, which may cause a decrease in tensile strength and elongation. Also, due to an increased amount of a solid solution of an Si element, the 0.2% yield strength is increased, the ease of routing and handling of an electric wire is decreased, and the conductivity is also decreased. Accordingly, the Si content is 0.1 mass % to 1.2 mass %. The Si content is, in a case where high strength is of importance, preferably 0.50 mass % to 1.2 mass %, and in a case where conductivity is of importance, preferably greater than or equal to 0.1 mass % and less than 0.5 mass %. Based on the points described above, the Si content is generally preferably 0.3 mass % to 0.7 mass %.

<Fe: 0.10 Mass % to 1.40 Mass %>

Fe (iron) is an element that contributes to refinement of crystal grains mainly by forming an Al—Fe based intermetallic compound and provides improved tensile strength. Fe dissolves in Al only by 0.05 mass % at 655° C., and even less at room temperature. Accordingly, the remaining Fe that cannot dissolve in Al will be crystallized or precipitated as an intermetallic compound such as Al—Fe, Al—Fe—Si, and Al—Fe—Si—Mg. An intermetallic compound mainly composed of Fe and Al as exemplified by the above-described intermetallic compounds is herein referred to as a Fe-based compound. This intermetallic compound contributes to the refinement of crystal grains and provides improved tensile strength. Further, Fe has, also by Fe that has dissolved in Al, an effect of providing an improved tensile strength. In a case where Fe content is less than 0.10 mass %, those effects are insufficient. In a case where Fe content is in excess of 1.40 mass %, a wire drawing workability decreases due to coarsening of crystallized materials or precipitates, and also the 0.2% yield strength increases, thus the ease of routing and handling decreases and the elongation is decreased. Therefore, the Fe content is 0.10 mass % to 1.40 mass %, and preferably 0.15 mass % to 0.70 mass %, and more preferably 0.15 mass % to 0.45 mass %.

The aluminum alloy wire rod of the present disclosure includes Mg, Si and Fe as essential components as described above, and may further contain both or any one of Ti and B, and at least one of Cu, Ag, Au, Mn, Cr, Zr, Hf, V, Sc, Co and Ni, as necessary.

<Ti: 0.001 Mass % to 0.100 Mass %>

Ti (titanium) is an element having an effect of refining the structure of an ingot during dissolution casting. In a case where an ingot has a coarse structure, the ingot may crack during casting or a wire break may occur during a wire rod processing step, which is industrially undesirable. In a case where the Ti content is less than 0.001 mass %, the aforementioned effect cannot be achieved sufficiently, and in a case where Ti content exceeds 0.100 mass %, the conductivity tends to decrease. Accordingly, the Ti content is 0.001 mass % to 0.100 mass %, preferably 0.005 mass % to 0.050 mass %, and more preferably 0.005 mass % to 0.030 mass %.

<B: 0.001 Mass % to 0.030 Mass %>

Similarly to Ti, B (boron) is an element having an effect of refining the structure of an ingot during dissolution casting. In a case where an ingot has a coarse structure, the ingot may crack during casting or a wire break is likely to occur during a wire rod processing step, which is industrially undesirable. In a case where the B content is less than 0.001 mass %, the aforementioned effect cannot be achieved sufficiently, and in a case where the B content exceeds 0.030 mass %, the conductivity tends to decrease. Accordingly, the B content is 0.001 mass % to 0.030 mass %, preferably 0.001 mass % to 0.020 mass %, and more preferably 0.001 mass % to 0.010 mass %.

To contain at least one of <Cu: 0.01 mass % to 1.00 mass %>, <Ag: 0.01 mass % to 0.50 mass %>, <Au: 0.01 mass % to 0.50 mass %>, <Mn: 0.01 mass % to 1.00 mass %>, <Cr: 0.01 mass % to 1.00 mass %>, and <Zr: 0.01 mass % to 0.50 mass %>, <Hf: 0.01 mass % to 0.50 mass %>, <V: 0.01 mass % to 0.50 mass/o %>, <Sc: 0.01 mass % to 0.50 mass %>, <Co: 0.01 mass % to 0.50 mass %/o>, and <Ni: 0.01 mass % to 0.50 mass %>.

Each of Cu (copper), Ag (silver), Au (gold), Mn (manganese), Cr (chromium), Zr (zirconium), Hf (hafnium), V (vanadium), Sc (scandium), Co (cobalt) and Ni (nickel) is an element having an effect of refining crystal grains and suppressing production of abnormal coarsely grown grain, and Cu, Ag and Au are elements further having an effect of increasing grain boundary strength by being precipitated at a grain boundary. In a case where at least one of the elements described above is contained by 0.01 mass % or more, the aforementioned effects can be achieved and a tensile strength and an elongation can be further improved. On the other hand, in a case where any one of Cu, Ag, Au, Mn, Cr, Zr, Hf, V, Sc, Co and Ni has a content exceeding the upper limit thereof mentioned above, a wire break is likely to occur since a compound containing such elements coarsens and deteriorates wire drawing workability, and also a conductivity tends to decrease. Therefore, ranges of contents of Cu, Ag, Au, Mn, Cr, Zr, Hf, V, Sc, Co and Ni are the ranges described above, respectively. Among elements in this group of elements, it is particularly preferable to contain Ni. When Ni is contained, a crystal grain refinement effect and an abnormal grain growth suppressant effect become significant, a tensile strength and an elongation improve, and also, it becomes easier to suppress a decrease in conductivity and a wire break during wire drawing. From the viewpoint of satisfying such effects while ensuring a good balance between these effects, it is further preferable that the Ni content is 0.05 mass % to 0.30 mass %.

As for Fe, Ti, B, Cu, Ag, Au, Mn, Cr, Zr, Hf, V, Sc, Co and Ni, when the sum of the contents of these elements is greater than 2.00 mass %, the conductivity and the elongation tend to decrease, the wire drawing workability tends to decrease, and further, the increase of the 0.2% yield strength tends to decrease the ease of routing and handling of an electric wire. Therefore, it is preferable that a sum of the contents of the elements is less than or equal to 2.00 mass %. Since in the aluminum alloy wire rod of the present disclosure, Fe is an essential element, the sum of the contents of Fe, Ti, B, Cu, Ag, Au, Mn, Cr, Zr, Hf, V, Sc, Co and Ni is preferably 0.10 mass % to 2.00 mass %. In a case where the above elements are added alone, the compound containing the element tends to coarsen more as the content increases. Since this may degrade wire drawing workability and a wire break is likely to occur, the content ranges of the respective elements are as specified above.

In order to moderately decrease the yield strength value, while maintaining a high conductivity, the sum of the contents of Fe, Ti, B, Cu, Ag, Au, Mn, Cr, Zr, Hf, V, Sc, Co and Ni is particularly preferably 0.10 mass % to 0.80 mass %, and further preferably 0.15 mass % to 0.60 mass %. On the other hand, although the conductivity is slightly decreased, in order to further increase the tensile strength and the elongation, and at the same time, in order to moderately decrease the yield strength value in relation to the tensile strength, the aforementioned content sum is particularly preferably greater than 0.80 mass % and less than or equal to 2.00 mass %, and further preferably 1.00 mass % to 2.00 mass %.

<Balance: Al and Inevitable Impurities>

The balance, i.e., components other than those described above, includes Al (aluminum) and inevitable impurities. Herein, inevitable impurities mean impurities contained by an amount which could be contained inevitably during the manufacturing process. Since inevitable impurities could cause a decrease in conductivity depending on a content thereof, it is preferable to suppress the content of the inevitable impurities to some extent considering the decrease in the conductivity. Components that may be inevitable impurities include, for example, Ga (gallium), Zn (zinc), Bi (bismuth), and Pb (lead).

Such an aluminum alloy wire rod can be obtained by combining and controlling alloy compositions and manufacturing processes. Hereinafter, a description is made of a preferred method of manufacturing an aluminum alloy wire rod of the present disclosure.

(2) Method of Manufacturing the Aluminum Alloy Wire Rod According to an Example of Present Disclosure The aluminum alloy wire rod according to an Example of the present disclosure can be manufactured through a manufacturing method including sequentially performing each process of [1] melting, [2] casting, [3] hot working (such as grooved roll working), [4] first wire drawing, [5] first heat treatment (intermediate heat treatment), [6] second wire drawing, [7] second heat treatment (solution heat treatment), and [8] third heat treatment (aging heat treatment). It is to be noted that a stranding step or a wire resin-covering step may be provided before or after the solution heat treatment or after the aging heat treatment. Hereinafter, steps of [1] to [8] will be described.

[1] Melting

In the melting step, a material is prepared by adjusting quantities of each component such that the aforementioned aluminum alloy composition is obtained, and the material is melted.

[2] Casting and [3] Hot Working (Such as Grooved Roll Working)

Subsequently, in the casting step, the cooling rate is increased, the crystallization of the Fe-based compound is moderately reduced and subjected to refinement. For example a bar having a diameter of 5 to 15 mm can be obtained by setting the average cooling rate, during casting, from the molten metal temperature to 400° C. preferably at 20 to 50° C./s, and by using a Properzi-type continuous casting rolling mill which is an assembly of a casting wheel and a belt. When an in-water spinning method is used, a bar having a diameter of 1 to 13 mm can be obtained at an average cooling rate of greater than or equal to 30° C./s. Casting and hot working (rolling) may be performed by billet casting and an extrusion technique. After the casting or the hot working, a re-heat treatment may also be applied, and when the re-heat treatment is applied, the time in which the temperature is retained at 400° C. or higher is preferably less than or equal to 30 minutes.

[4] First Wire Drawing

Subsequently, the surface is stripped and the bar is made into an appropriate size of, for example, 5 mmφ to 12.5 mmφ, and wire drawing is performed by cold rolling. A reduction ratio η is preferably within a range of 1 to 6. Herein, the "reduction ratio η" is represented by η=ln(A0/A1), where A0 is a wire rod cross sectional area before wire drawing and A1 is a wire rod cross sectional area after wire drawing. In a case where the reduction ratio η is less than 1, in a heat treatment of a subsequent step, recrystallized grains coarsen and a tensile strength and an elongation significantly decrease, which may cause a wire break. In a case where the reduction ratio η is greater than 6, the wire drawing becomes difficult and may be problematic from a quality point of view since a wire break might occur during a wire drawing process. The stripping of the surface has an effect of cleaning the surface, but does not need to be performed.

[5] First Heat Treatment (Intermediate Heat Treatment)

Then, a first heat treatment is applied to the work piece that has been subjected to cold drawing. The first heat treatment of the present disclosure is performed for regaining the flexibility of the work piece and for improving the wire drawing workability. It is not necessary to perform the first heat treatment if the wire drawing workability is sufficient and a wire break will not occur.

[6] Second Wire Drawing

After the first heat treatment, wire drawing is further carried out in a cold processing. During this drawing, a reduction ratio η is preferably within a range of 1 to 6. The reduction ratio η has an influence on formation and growth of recrystallized grains. This is because, if the reduction ratio η is less than 1, during the heat treatment in a subsequent step, there is a tendency such that coarsening of recrystallized grains occur and the tensile strength and the elongation drastically decrease, and if the reduction ratio η is greater than 6, wire drawing becomes difficult and there is a tendency such that problems arise in quality, such as a wire break during wire drawing. It is to be noted that in a case where the first heat treatment is not performed, the first wire drawing and the second wire drawing may be performed in series.

It is also necessary for a line tension applied to a work piece having a wire size of twice the final wire size until a wire rod having the final wire size is obtained is less than or equal to 50 N. In a common prior art mass production, a continuous wire drawing is performed by using approximately 10 to 20 dies. In such a case, a large stress is generated in the wire rod immediately before winding up, namely, the wire rod between the final die and the take-up roller, and causes generation of voids in the matrix. Accordingly, in the second wire drawing process in the present disclosure, wire drawing is performed with the maximum line tension of less than or equal to 50 N, during a period of time in which a wire size of the wire rod changes from a wire size of twice the final wire size to the final wire size. By setting the maximum line tension to be less than or equal to 50 N, a stress to the wire rod can be decreased, and the generation of voids can be suppressed. A maximum line tension of greater than 50 N is not preferable since the stress to the wire rod becomes large, and voids in the vicinity of Fe-based compound in the matrix will increase.

Figure 1B:
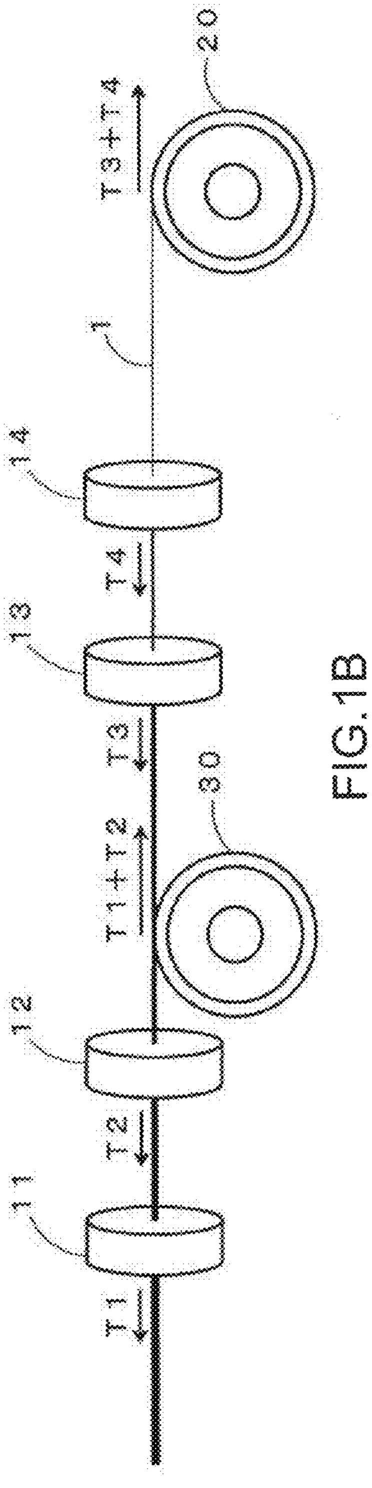

Explaining, for example, with four dies for the sake of convenience, in a conventional wire drawing process, as shown in FIG. 1A, tensions T1, T2, T3 and T4 are applied to dies 11, 12, 13 and 14, respectively, and a large tension (T1+T2+T3+T4) is applied to a wire rod 1' between the die 14, which is the final die, and a take-up roller 20. Accordingly, in the wire drawing process of the present embodiment, a method is employed in which, as shown in FIG. 1B, by arranging a power-driven pulley 30 between the die 12 and the die 13, a small tension (T3+T4) is applied between the die 14 and the take-up roller 20. It is to be noted that the wire drawing with a maximum line tension of less than or equal to 50 N may be performed for a part of or the whole of the second wire drawing process, or alternatively, may be performed not only during the second wire drawing process, but also during both the first wire drawing process and during the second wire drawing process. By limiting the number of dies used, for example, by increasing the processing rate per one path in the dies, the formation of voids in the portion surrounding the Fe-based compound can also be suppressed.

[7] Second Heat Treatment (Solution Heat Treatment)

The second heat treatment is performed on the work piece that has been subjected to wire drawing. The second heat treatment of the present embodiment is a solution heat treatment for dissolving randomly contained compounds of Mg and Si into an aluminum matrix. With the solution treatment, it is possible to even out the Mg and Si concentration parts during a working (it homogenizes) and leads to a suppression in the segregation of a Mg compound and a Si compound at grain boundaries after the final aging heat treatment. The second heat treatment is specifically a heat treatment including heating to a predetermined temperature in a range of 450° C. to 580° C., retaining at the predetermined temperature for a predetermined time, and thereafter cooling at an average cooling rate of greater than or equal to 10° C./s to at least a temperature of 150° C. When a predetermined temperature during the second heat treatment is higher than 580° C., the crystal grain size is coarsened and abnormally grown grains are produced, and in a case where the predetermined temperature is lower than 450° C., $Mg_2Si$ cannot be sufficiently solid dissolved. Therefore, the predetermined temperature during the heating in the second heat treatment is in a range of 450° C. to 580° C., and although the predetermined temperature may vary depending on the contents of Mg and Si, the predetermined temperature is preferably in a range of 450° C. to 540° C., and more preferably in a range of 480° C. to 520° C. In a case where a re-heat treatment or an intermediate heat treatment is performed, a period of time in which the wire rod is retained at the predetermined temperature in the second heat treatment is preferably set to fall within a range of less than or equal to 30 minutes, inclusive of the times for the re-heat treatment and the intermediate heat treatment.

A method of performing the second heat treatment may be, for example, batch heat treatment, salt bath, or may be continuous heat treatment such as high-frequency heating, conduction heating, and running heating.

In a case where high-frequency heating and conduction heating are used, the wire rod temperature increases with a passage of time, since it normally has a structure in which an electric current continues to flow through the wire rod. Accordingly, since the wire rod may melt when an electric current continues to flow through, it is necessary to perform heat treatment for an appropriate time range. In a case where running heating is used, since it is an annealing in a short time, the temperature of a running annealing furnace is usually set higher than a wire rod temperature. Since the wire rod may melt with a heat treatment over a long time, it is necessary to perform heat treatment in an appropriate time range. Also, all heat treatments require at least a predetermined time period in which an Mg—Si compound contained randomly in the work piece will be dissolved into an aluminum matrix. Hereinafter, the heat treatment by each method will be described The continuous heat treatment by high-frequency heating is a heat treatment by joule heat generated from the wire rod itself by an induced current by the wire rod continuously passing through a magnetic field caused by a high frequency. Steps of rapid heating and quenching are included, and the wire rod can be heat-treated by controlling the wire rod temperature and the heat treatment time. The cooling is performed after rapid heating by continuously allowing the wire rod to pass through water or in a nitrogen gas atmosphere. The heating retention time in this heat treatment is preferably 0.01 s to 2 s, more preferably 0.05 s to 1 s, and furthermore preferably 0.05 s to 0.5 s.

The continuous conducting heat treatment is a heat treatment by joule heat generated from the wire rod itself by allowing an electric current to flow in the wire rod that continuously passes two electrode wheels. Steps of rapid heating and quenching are included, and the wire rod can be heat-treated by controlling the wire rod temperature and the heat treatment time. The cooling is performed after rapid heating by continuously allowing the wire rod to pass through water, atmosphere or a nitrogen gas atmosphere. The heating retention time in this heat treatment is preferably 0.01 s to 2 s, more preferably 0.05 s to 1 s, and furthermore preferably 0.05 s to 0.5 s.

A continuous running heat treatment is a heat treatment in which the wire rod continuously passes through a heat treatment furnace retained at a high-temperature. Steps of rapid heating and quenching are included, and the wire rod can be heat-treated by controlling the temperature in the heat treatment furnace and the heat treatment time. The cooling is performed after rapid heating by continuously allowing the wire rod to pass through water, atmosphere or a nitrogen gas atmosphere. The heating retention time in this heat treatment is preferably 0.5 s to 30 s.

In a case where at least one of the wire rod temperature and the heat treatment time is lower than the condition defined above, the solution heat treatment will be incomplete, and solute atom clusters, a β"phase and a $Mg_2Si$ precipitate produced during the aging heat treatment, which is a post-process, are reduced, and the improvement magnitudes of the tensile strength, the shock resistance, the bending fatigue resistance and the conductivity are decreased. In a case where at least one of the wire rod temperature and the heat treatment time is higher than the condition specified above, the crystal grains coarsen and a partial fusion (eutectic fusion) of a compound phase of an aluminum alloy wire rod occurs, and the tensile strength and the elongation decrease, and a wire break is likely to occur during the handling of the conductor.

[8] Third Heat Treatment (Aging Heat Treatment)

Subsequently, a third heat treatment is applied. The third heat treatment is an aging heat treatment performed for producing Mg and Si compounds and solute atom clusters. In the aging heat treatment, heating is performed at a predetermined temperature within a range from 20° C. to 250° C. In a case where the predetermined temperature in the aging heating treatment is lower than 20° C., the production of the solute atom cluster is slow and requires time to obtain necessary tensile strength and elongation, and thus it is disadvantageous for mass-production. In a case where the predetermined temperature is higher than 250° C., in addition to the $Mg_2Si$ needle-like precipitate (β" phase) most contributing to the strength, coarse $Mg_2Si$ precipitates are produced to decrease the strength. Accordingly, the predetermined temperature is preferably 20° C. to 70° C. in a case where the solute atom cluster being more effective in improving elongation is produced, and is preferably 100° C. to 150° C. in a case where the β" phase is simultaneously precipitated, and the balance between the tensile strength and the elongation is achieved.

Moreover, as for the heating retention time in the aging heat treatment, the optimal time varies depending on the temperature. For the purpose of improving the tensile strength and the elongation, a long heating time is preferable when the temperature is low and a short heating time is preferable when the temperature is high. For example, a long heating time is ten days or less, and, a short heating time is, preferably, 15 hours or less, and more preferably, 8 hours or less. It is to be noted that, in the cooling in the aging heat treatment, in order to prevent dispersion of the properties, it is preferable to increase the cooling rate as much as possible. Of course, even in a case where cooling cannot be performed quickly due to the manufacturing process, the cooling rate can be appropriately set if the cooling time is an aging condition with which solute atom clusters are produced sufficiently.

A strand diameter of the aluminum alloy wire rod of the present embodiment is not particularly limited and can be determined appropriately according to the purpose of use, and is preferably 0.1 mm to 0.5 mmϕ for a fine wire, and 0.8 mm to 1.5 mmϕ for a middle sized wire. The aluminum alloy wire rod of the present embodiment is advantageous in that the aluminum alloy wire can be used as a thin single wire as an aluminum alloy wire, but may also be used as an aluminum alloy stranded wire obtained by stranding a plurality of them together, and among the aforementioned steps [1] to [8] of the manufacturing method of the present disclosure, after bundling and stranding a plurality of aluminum alloy wire rods obtained by sequentially performing the respective steps [1] to [6], the steps of [7] the solution heat treatment and [8] the aging heat treatment may also be performed.

Also, in the present embodiment, such a homogenizing heat treatment as performed in the prior art may be further performed as an additional step after the casting step or the hot working. Since the homogenizing heat treatment can uniformly disperse the added elements, a solute atom cluster and the β" precipitation phase are easily produced uniformly in the subsequent third heat treatment, and the improvement of the tensile strength, the improvement of the elongation, and a moderate low yield strength value in relation to the tensile strength are obtained more stably. The homogenizing heat treatment is performed at a heating temperature of preferably 450° C. to 600° C. and more preferably 500° C. to 600° C. Also, the cooling in the homogenizing heat treatment is preferably a slow cooling at an average cooling rate of 0.1° C./min to 10° C./min because of the easiness in obtaining a uniform compound.

(3) Structural Features of Aluminum Alloy Wire Rod of Present Disclosure

The aluminum alloy wire rod of the present disclosure produced by the production method as described above has a feature in that, in a cross section parallel to a lengthwise direction of the wire rod, no void having an area larger than 20 μm$^2$ is present, or even in a case where at least one void having an area larger than 20 μm$^2$ is present in the aforementioned cross section, a presence ratio of the at least one void per 1000 μm$^2$ is on average in a range of less than or equal to one void/1000 $\mu m^2$. This is because, in a case where the presence ratio of the void having an area of greater than 20 $\mu m^2$ is greater than one void/1000 $\mu m^2$, when vibration is applied, the voids may act as stress concentration sources, which are likely to cause cracks and also accelerate propagation of the cracks, and thus may decrease an operating life of the aluminum alloy wire rod. The aluminum alloy wire rod of the present disclosure is designed to have a structure in which a presence ratio of voids each having an area of greater than 1 $m^2$ in the aforementioned cross section is preferably limited to a range of less than or equal to one void per 1000 $\mu m^2$. Further, the aluminum alloy wire rod of the present disclosure is more preferably designed to have a structure in which no Fe-based compound particle having an area of greater than 4 $\mu m^2$ is present in the aforementioned cross section, or even in a case where at least one such Fe-based compound particle is present in the aforementioned cross section, a presence ratio of the at least one Fe-based compound particle per 1000 $\mu m^2$ is on average in a range of less than or equal to one particle/1000 $\mu m^2$. In a case where at least one Fe-based compound particle having an area of greater than 4 $\mu m^2$ is present in an average ratio of greater than one particle/1000 $\mu m^2$, voids tend to be generated around the Fe-based compound particles and the operating life of the aluminum alloy wire rod tends to decrease. Moreover, the aluminum alloy wire rod of the present disclosure more preferably has a structure in which a presence ratio of at least one Fe-based compound particle having an area of 0.002 to 1 $\mu m^2$ in the aforementioned cross section is on average greater than or equal to one particle/1000 $\mu m^2$, and additionally, when at least 1000 adjacent and consecutive crystal grains randomly selected in a metal structure were observed, the average presence probability of the at least one crystal grain having a maximum dimension in the diameter direction of the wire rod of greater than or equal to half the diameter of the wire rod is particularly preferably less than 0.10% (more specifically, when 1000 crystal grains are observed, the number of the at least one crystal grain having a maximum dimension in the diameter direction of the wire rod of greater than or equal to half the diameter of the wire rod is on average less than one). In a case where the presence ratio of the at least one Fe-based compound particle having an area of 0.002 to 1 $\mu m^2$ is greater than or equal to one particle/1000 $\mu m^2$, an effect of formation of crystal nuclei by the Fe-based compound particles or an effect of pinning the grain boundaries are readily obtained, and consequently, unpreferable coarse crystal grains are less likely to be generated. In a case where at least one crystal grain having a diameter greater than or equal to half the wire rod diameter is present in the observation of the crystal grains described above, the bending fatigue characteristics and the vibration resistance are possibly remarkably decreased, and thus it is preferable that such crystal grains are produced as little as possible.

(4) Characteristics of Aluminum Alloy Wire Rod of Present Disclosure

The vibration resistance is, in order to withstand vibration of an engine, such that, preferably, the number of cycles of vibration to fracture is greater than or equal to 2,000,000 cycles and more preferably greater than or equal to 4,000,000 cycles.

The bending fatigue resistance is, in order to withstand the repeated bending in the door portion, such that, preferably, the number of cycles of bending to fracture is greater than or equal to 200,000 cycles and more preferably greater than or equal to 400,000 cycles.

In order to prevent heat generation due to joule heat, the conductivity is preferably greater than or equal to 40% IACS and more preferably greater than or equal to 45% IACS. The conductivity is furthermore preferably greater than or equal to 50% IACS, and in this case, a further reduction of the diameter can be achieved.

The 0.2% yield strength is preferably less than or equal to 250 MPa in order not to decrease the workability during the attachment of the wire harness.

Also, the aluminum alloy wire rod of the present disclosure can be used as an aluminum alloy wire, or as an aluminum alloy stranded wire obtained by stranding a plurality of aluminum alloy wires, and may also be used as a covered wire having a covering layer at an outer periphery of the aluminum alloy wire or the aluminum alloy stranded wire, and, in addition, the aluminum alloy wire rod can also be used as a wire harness having a covered wire and a terminal fitted at an end portion of the covered wire, the covering layer being removed from the end portion.

EXAMPLES

Examples and Comparative Examples

Alloy materials including Mg, Si, Fe and Al, as essential components and at least one of Ti, B, Cu, Ag, Au, Mn, Cr, Zr, Hf, V, Sc, Co and Ni as an selectively added component with chemical compositions (mass %) shown in Table 1 were prepared, and the alloy materials were continuously rolled while being cast by using a Properzi-type continuous casting rolling mill with a mold water cooling the molten metals, under the conditions shown in Table 2, to obtain bars of ϕ9 mm obtained. Then, the first wire drawing process was applied to each of the bars to obtain a predetermined reduction ratio. Then, to the work pieces subjected to the first wire drawing process, the first heat treatment (the intermediate heat treatment) was applied, and the second wire drawing process was further applied until a wire size of ϕ0.3 mm was obtained so as for the predetermined reduction ratio to be obtained. Then, the second heat treatment (the solution heat treatment) was applied under the conditions shown in Table 2. Both in the first heat treatment and in the second heat treatment, in a case of a batch heat treatment, the wire rod temperature was measured with a thermocouple wound around the wire rod. In the continuous conducting heat treatment, since measurement at a part where the temperature of the wire rod was the highest was difficult due to equipment, the temperature was measured with a fiber optic radiation thermometer (manufactured by Japan Sensor Corporation) at a position upstream of a portion where the temperature of the wire rod was highest, and the maximum temperature was calculated in consideration of joule heat and heat dissipation. In each of the high-frequency heating and the consecutive running heat treatment, the wire rod temperature in the vicinity of the heat treatment section outlet was measured. The third heat treatment (the aging heat treatment) was applied under the conditions shown in Table 2, and aluminum alloy wires were produced.

For each of the produced aluminum alloy wires of Examples and Comparative Examples, the respective characteristics were measured by the methods shown below.

(A) Vibration Resistance Test

Figure 4:
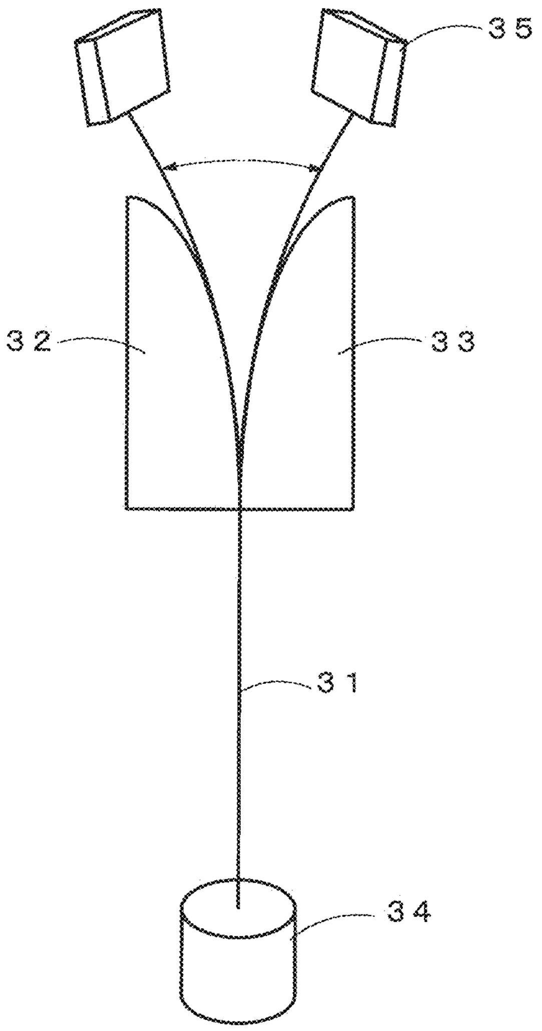
FIG. 4 is an explanatory diagram of the vibration resistance test and the bending fatigue test for evaluating the aluminum alloy wire rod of the present embodiment.

The vibration resistance performance was measured with n device named "Repeated Bending Tester" manufactured by Fujii Seiki Co., Ltd. (now Fujii Co., Ltd.), under the assumption that the strain is a strain loaded to an aluminum wire due to the vibration in an engine, by using a jig which gives a 0.09% bending distortion to the outer periphery of the wire rod. FIG. 4 shows a schematic diagram of the measurement device. In a case where the wire rod outer periphery strain is 0.09%, with the wire rod of ϕ0.3 mm, the radius of curvature of each of bending jigs 32 and 33 is 170 mm. The wire rod 31 was inserted into a 1-mm gap formed between the bending jigs 32 and 33, and was moved repeatedly to lie along the bending jigs 32 and 33. The wire rod has one end fixed to a holding jig 35 in such a way that a repeated bending can be performed, and the other end whereto a weight 34 of approximately 10 g was connected and suspended therefrom. During the test, the holding jig 35 moves, and accordingly the wire rod 31 fixed to the holding jig 35 also moves, and thus a repeated bending can be performed. The measurement was performed under the conditions that the ambient temperature was maintained at 25±5° C., and at a rate of 100 reciprocating cycles per minute. With this method, the number of cycles of vibration to fracture of the aluminum alloy wire was measured. In present Examples, a case where the number of cycles of vibration to fracture was greater than or equal to 2,000,000 cycles was determined to have a sufficient vibration resistance performance, and thus was determined to have passed the test. It is to be noted that the vibration resistance test requires a relatively long period of time, and hence in the cases where the number of cycles of vibration exceeded 2,000,000 cycles, the test was terminated at a certain number of the repeated vibrations exceeding 2,000,000 cycles.

(B) Conductivity (EC)

In a constant temperature bath in which a test piece of 300 mm in length is held at 20° C. (±0.5° C.), a resistivity was measured for three materials under test (aluminum alloy wires) each time using a four terminal method, and an average conductivity was calculated. The distance between the terminals was 200 mm. In present Examples, the conductivity of greater than or equal to 45% IACS was regarded as an acceptable level.

(C) Method of Measuring Bending Fatigue Resistance

The bending fatigue resistance in an ambient temperature of 25±5° C. was evaluated with the device (device name "Repeated Bending Tester" manufactured by Fujii Seiki Co., Ltd. (now Fujii Co., Ltd.) used in the above-described vibration resistance test, and by using this time bending jigs 32 and 33 each having a radius of curvature of 90 mm in order to give a 0.17% bending strain to the periphery of a wire rod. This corresponds to taking a strain amplitude of ±0.17% as a reference for the bending fatigue resistance. The bending fatigue resistance varies depending on the strain amplitude. In general, in a case where the strain amplitude is large, a fatigue life tends to decrease, and in a case where the strain amplitude is small, the fatigue life tends to increase. Since the strain amplitude can be determined by a wire size of the wire rod and a radius of curvature of a bending jig, a bending fatigue test can be carried out with the wire size of the wire rod and the radius of curvature of the bending jig being set arbitrarily. By using this device, the method shown in FIG. 4, and a jig capable of giving a 0.17% bending strain, a repeated bending was carried out and the number of cycles of bending to fracture was measured. The number of bending cycles was measured for four rods each time, and an average value thereof was obtained. In the present Examples, the number of cycles of bending to fracture of greater than or equal to 200,000 cycles was regarded as acceptable.

(D) Method of Measuring Voids

The produced aluminum alloy wire rod was processed with ion milling until the center can be observed, and an area ($\mu m^2$) and a presence ratio (void/1000 $\mu m^2$) of the voids present in a cross section parallel to the lengthwise direction of the wire rod was measured by using a scanning electron microscope (SEM). The area of the voids was calculated from an image observed with SEMEDX Type N manufactured by Hitachi Science Systems Co., Ltd. under the conditions that the electron beam acceleration voltage was 20 kV and the magnification was 1000× to 10000×, by specifying the boundary with a free software ImageJJ. Specifically, in the aforementioned cross section, the presence ratio (dispersion density) of voids each having an area of greater than 1 $\mu m^2$ or an area of greater than 20 $\mu m^2$ was measured by using the following technique. As a first point, an arbitrary position of the wire rod was selected, and at this position, observation is performed within an area range of 1000 $\mu m^2$ in the aforementioned cross section. As a second point, a position of the wire rod spaced apart by 1000 mm or more in the lengthwise direction of the wire rod from the first point is selected, and at this position, observation is performed within an area range of 1000 $\mu m^2$ in the aforementioned cross section. As a third point, a position of the wire rod spaced apart by 2000 mm or more in the lengthwise direction of the wire rod from the first point and spaced apart by 1000 mm or more in the lengthwise direction of the wire rod from the second point is selected, and at this position, observation is performed within an area range of 1000 $\mu m^2$ in the aforementioned cross section; in the aforementioned cross section, the presence ratio (void/1000 $\mu m^2$) of the at least one void having an area of greater than 1 $\mu m^2$ or an area of greater than 20 $\mu m^2$ was calculated.

(E) Method of Measuring Fe-Based Compound

The produced aluminum alloy wire rod was processed with ion milling until the center can be observed, and an area ($\mu m^2$) and a presence ratio (particle/1000 $\mu m^2$) of the Fe-based compound particles present in a cross section parallel to the lengthwise direction of the wire rod was measured by using a scanning electron microscope (SEM). Specifically, the presence ratio of the Fe-based compound particles each having an area of greater than 4 $\mu m^2$ or an area of 0.002 to 1 $\mu m^2$, present in the aforementioned cross section, was measured by using the following technique. As a first point, an arbitrary position of a wire rod was selected, and at this position, observation is performed within an area range of 1000 $\mu m^2$ in the aforementioned cross section. As a second point, arbitrary position of the wire rod spaced apart by 1000 mm or more in the lengthwise direction of the wire rod from the first point is selected, and at this position, observation is performed within an area range of 1000 $\mu m^2$ in the aforementioned cross section. As a third point, a position of the wire rod spaced apart by 2000 mm or more in the lengthwise direction of the wire rod from the first point and spaced apart by 1000 mm or more in the lengthwise direction of the wire rod from the second point are selected, and at this position, observation is performed within an area range of 1000 $\mu m^2$ in the aforementioned cross section. The presence ratio (particles/1000 $\mu m^2$) of the at least one Fe-based compound particle having an area of greater than 4 $\mu m^2$ or an area of 0.002 to 1 $\mu m^2$ present in the aforementioned cross section was calculated.

For the identification of the Fe-based compound, an elemental analysis was performed by using SEMEDX Type N manufactured by Hitachi Science Systems Co., Ltd., at an electron beam acceleration voltage of 20 kV.

In a case where the count of Fe exceeds twice the background, it is identified as the Fe-based compound. The area of the Fe-based compound was calculated from an image observed with the SEMEDX Type N, at a magnification of 1000× to 10000×, by specifying the boundary with a free software ImageJJ.

Figure 2A:
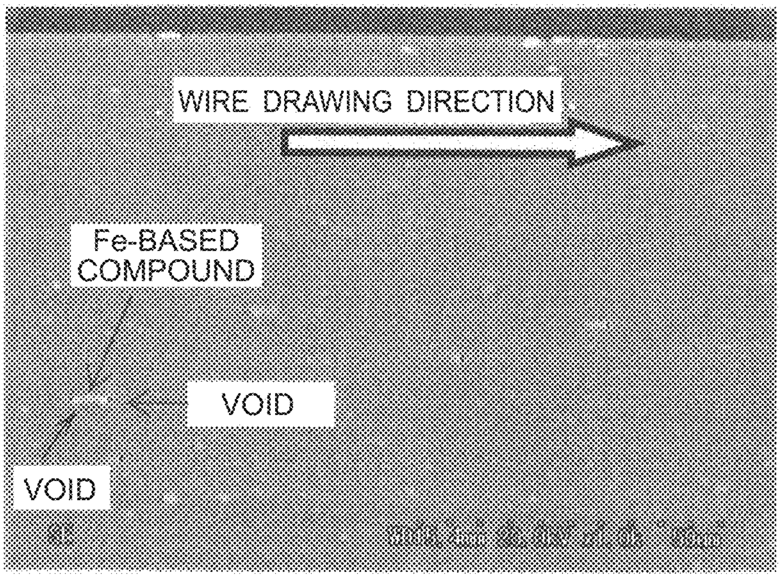
Figure 2B:
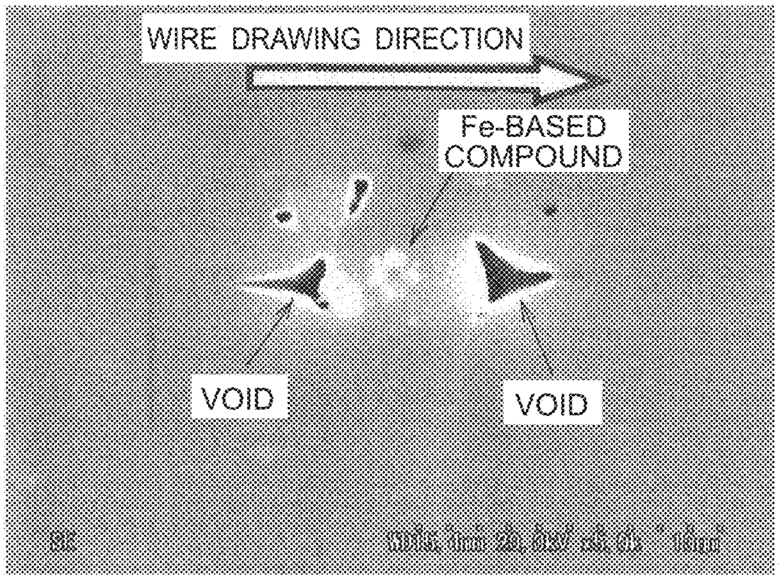
Figure 3:
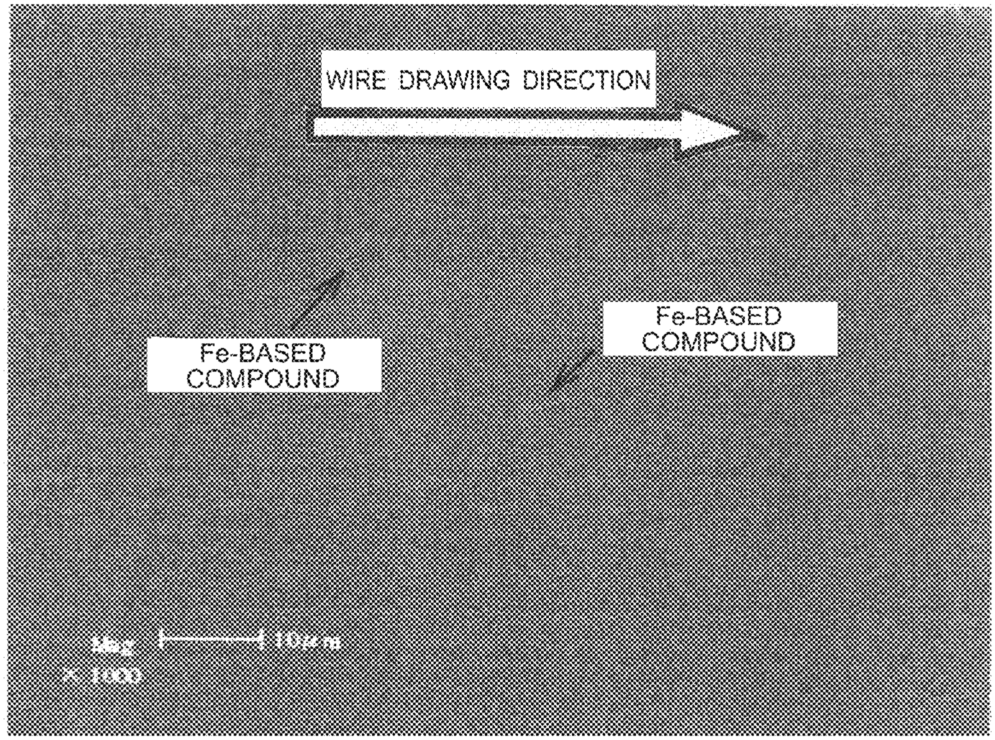
FIG. 3 is the cross-sectional image (magnification: 1000×) of the cross section parallel to the lengthwise direction of the wire rod of the aluminum alloy wire rod of the present embodiment, photographed with a scanning electron microscope (SEM).

FIGS. 2A and 2B show SEM images of conventional aluminum alloy wire rods and FIG. 3 shows a SEM image of an aluminum alloy wire rod as an example of the present embodiment, obtained in the measurement of voids and the evaluation of the Fe-based compound. Such cross sectional images as presented above were evaluated as described above.

(F) Method of Measuring Dimension of Crystal Grains

Figure 5:
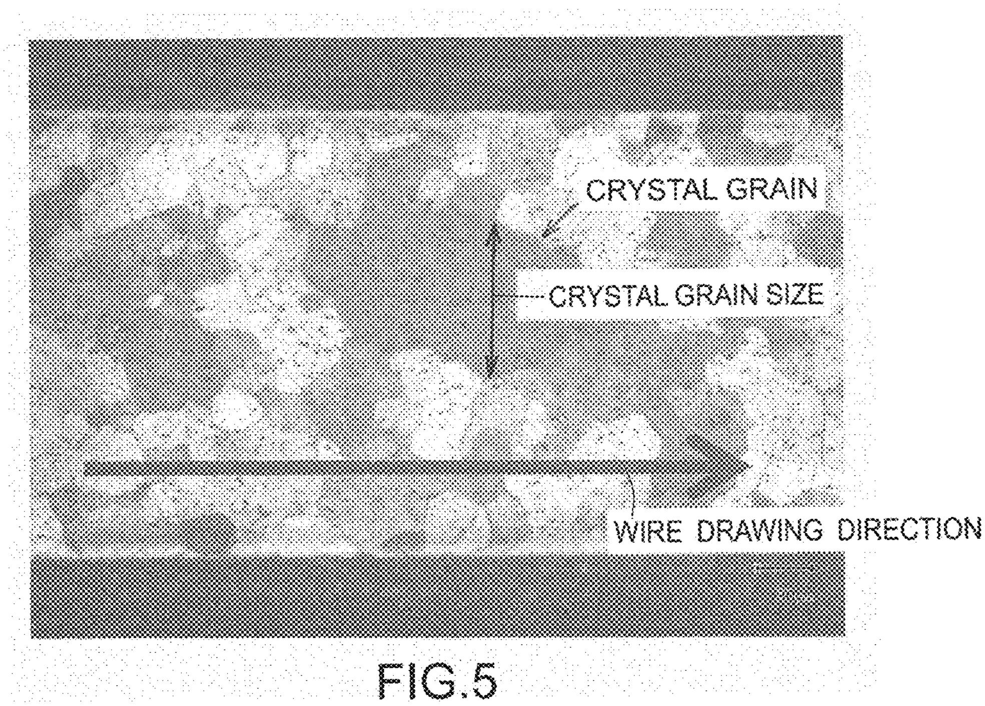
FIG. 5 is a cross-sectional image for explanation of the method for measuring the crystal grain size by photographing the cross section parallel to the lengthwise direction of the wire rod of the aluminum alloy wire rod of the present embodiment, with an optical microscope.

Each of the obtained wire rods was cut out in such a way that the cross section including the center line of the wire rod and parallel to the lengthwise direction (wire drawing direction) of the wire rod can observed, embedded in a resin, and subjected to mechanical polishing and electrolytic polishing. Then, the cross section was photographed with an optical microscope at a magnification of 200× to 400× by using a polarizing plate, and an image shown in FIG. 5 was obtained. In the photographed image, the maximum length (wire rod radial direction length) of a crystal grain in a plane in the direction perpendicular to the wire rod lengthwise direction (wire drawing direction) was defined as the diameter of the crystal grain, at least 1000 adjacent and consecutive crystal grains randomly selected were observed, and it was verified whether or not the crystal grains each having a diameter greater than or equal to half the wire rod diameter were present.

The presence probability P (%) of the crystal grains each having the maximum dimension (the diameter of the crystal grain) in the diameter direction of the wire rod greater than or equal to half the diameter (wire size) of the wire rod is converted into a numerical value by using the following formula:

$$P(\%)=(\text{number of crystal grains each having a diameter greater than or equal to half the wire size}/\text{number of measured crystal grains})\times 100$$

Table 2 shows the results obtained by comprehensively evaluating the characteristics of the wire rods by the above-described methods. It is to be noted that in the column indicating evaluation in Table 2, "A" indicates cases where the number of cycles of vibration is greater than or equal to 4,000,000 cycles, the conductivity is greater than or equal to 45% IACS, the number of cycles of bending is greater than or equal to 400,000 cycles and the 0.2% yield strength is less than 200 MPa, "B" indicates a cases where the number of cycles of vibration is greater than or equal to 2,000,000 cycles and less than 4,000,000 cycles, the conductivity is greater than or equal to 40% IACS, the number of cycles of bending is greater than or equal to 200,000 cycles and the 0.2% yield strength is less than 200 MPa, and "C" indicates a case corresponding to at least one of the following conditions: the number of cycles of vibration is less than 2,000,000 cycles, the conductivity is less than 40% IACS, the number of bending fatigue is less than 200,000 cycles, and the 0.2% yield strength is greater than or equal to 250 MPa.

TABLE 1

| | Chemical composition (mass %) | | | | | | | | | | | | | | | | |
|---|---|---|---|---|---|---|---|---|---|---|---|---|---|---|---|---|---|
| | Mg | Si | Fe | Ti | B | Cu | Ag | Au | Mn | Cr | Zr | Hf | V | Sc | Co | Ni | Balance |
| Example 1 | 0.42 | 0.80 | 0.10 | — | — | — | — | — | 0.10 | — | — | — | — | — | — | — | Al and |
| Example 2 | 0.42 | 0.80 | 0.10 | 0.01 | 0.005 | — | — | — | — | — | 0.05 | — | — | — | — | — | inevitable |
| Example 3 | 0.42 | 0.80 | 0.20 | 0.01 | 0.005 | — | — | — | — | — | — | — | — | — | — | 0.15 | impurities |
| Example 4 | 0.42 | 0.80 | 0.20 | 0.01 | 0.005 | — | — | — | 0.05 | — | — | — | — | — | — | — | |
| Example 5 | 0.42 | 0.80 | 0.30 | 0.01 | 0.005 | — | — | — | — | — | — | — | — | — | — | 0.10 | |
| Example 6 | 0.42 | 0.80 | 0.30 | 0.01 | 0.005 | — | — | — | — | 0.05 | — | — | — | — | — | — | |
| Example 7 | 0.50 | 0.90 | 1.20 | 0.01 | 0.005 | — | — | — | — | — | — | — | — | — | — | — | |
| Example 8 | 0.40 | 0.75 | 0.25 | 0.01 | 0.005 | — | — | — | — | — | — | — | — | — | — | 0.05 | |
| Example 9 | 0.40 | 0.75 | 0.25 | 0.01 | 0.005 | — | — | — | — | — | — | — | — | — | — | 0.05 | |
| Comparative Example 1 | 0.42 | 0.80 | 1.50 | 0.01 | 0.005 | — | — | — | 0.05 | — | — | — | — | — | — | — | Al and inevitable |
| Comparative Example 2 | 0.42 | 0.80 | 0.01 | 0.01 | 0.005 | — | — | — | — | 0.05 | — | — | — | — | — | — | impurities |
| Comparative Example 3 | 0.42 | 0.80 | 0.30 | 0.01 | 0.005 | — | — | — | — | 0.05 | — | — | — | — | — | — | |
| Comparative Example 4 | 0.40 | 0.75 | 0.25 | 0.01 | 0.005 | — | — | — | — | — | — | — | — | — | — | 0.05 | |
| Comparative Example 5 | 0.40 | 0.75 | 0.25 | 0.01 | 0.005 | — | — | — | — | — | — | — | — | — | — | 0.05 | |
| Comparative Example 6 | 0.60 | 0.60 | 0.20 | 0.01 | 0.005 | 0.20 | — | — | — | — | 0.10 | — | — | — | — | — | |

TABLE 2

| | Average cooling rate from molten metal temp. to 400° C. during casting | Re-heat treatment after casting | | Solution heating time | | | Aging heat treatment | | Maximum line tension from twice the final wire size to final wire size | Presence ratio of void(s) | |
|---|---|---|---|---|---|---|---|---|---|---|---|
| | | Heating temp. | Retention time | Heating temp. | Retention time | Average cooling rate at least to a temp. of 150° C. | Heating temp. | Retention time | | Area greater than 1 μm² void(s)/1000 μm² | Area greater than 20 μm² void(s)/1000 μm² |
| | ° C./s | ° C. | s | ° C. | s | ° C./s | ° C. | h | N | | |
| Example 1 | 25 | 550 | 10 | 500 | 30 | 19 | 150 | 5 | 40 | 0.9 | 0 |
| Example 2 | 25 | 550 | 10 | 500 | 60 | 17 | 150 | 6 | 38 | 0.1 | 0.1 |
| Example 3 | 25 | 550 | 10 | 500 | 300 | 18 | 150 | 5 | 43 | 0 | 0 |
| Example 4 | 25 | 550 | 5 | 540 | 10 | 16 | 150 | 6 | 41 | 0 | 0 |

TABLE 2-continued

| | | | | | | | | | | | |
|---|---|---|---|---|---|---|---|---|---|---|---|
| Example 5 | 25 | 550 | 10 | 640 | 60 | 18 | 150 | 6 | 39 | 0.6 | 0.3 |
| Example 6 | 25 | 550 | 10 | 580 | 120 | 21 | 150 | 5 | 37 | 0.8 | 0.6 |
| Example 7 | 25 | 550 | 10 | 500 | 60 | 17 | 150 | 5 | 38 | 0.4 | 0.2 |
| Example 8 | 25 | 550 | 5 | 540 | 10 | 16 | 150 | 5 | 48 | 0.8 | 0.7 |
| Example 9 | 25 | 550 | 5 | 540 | 10 | 16 | 150 | 5 | 38 | 0 | 0 |
| Comparative Example 1 | 25 | 550 | 10 | 500 | 30 | 17 | 160 | 6 | 39 | 4 | 1 |
| Comparative Example 2 | 25 | 550 | 10 | 540 | 10 | 18 | 150 | 5 | 41 | 1 | 0 |
| Comparative Example 3 | 25 | 550 | 10 | 540 | 300 | 20 | 150 | 5 | 60 | 7 | 2 |
| Comparative Example 4 | 25 | 550 | 5 | 640 | 10 | 16 | 150 | 5 | 53 | 5 | 2 |
| Comparative Example 5 | 25 | 550 | 5 | 540 | 10 | 16 | 160 | 6 | 55 | 8 | 3 |
| Comparative Example 6 | 10 | 550 | 10 | 580 | 600 | 15 | 175 | 6 | 70 | 6 | 2 |

| | Presence ratio of Fe-based compound particle(s) | | Average presence probability of crystal grains | Characteristics | | | | |
|---|---|---|---|---|---|---|---|---|
| | Area of 0.002 to 1 µm$^2$ particle(s)/1000 µm$^2$ | Area greater than 4 µm$^2$ particle(s)/1000 µm$^2$ | each having a diameter greater than or equal to half of wire size % | Number of cycles of vibration 10000 Cycles | Conductivity % IACS | Number of cycles of bending 10000 Cycles | 0.2% Yield strength MPa | Evaluation |
| Example 1 | 3 | 0 | 0 | 324 | 48.7 | 31 | 145 | B |
| Example 2 | 4 | 0 | 0 | 379 | 49.2 | 35 | 185 | B |
| Example 3 | 5 | 0.5 | 0 | 430 | 49.2 | 42 | 189 | A |
| Example 4 | 4 | 0 | 0 | 383 | 45.9 | 38 | 160 | B |
| Example 5 | 5 | 0.2 | 0 | 505 | 48.5 | 44 | 171 | A |
| Example 6 | 3 | 0.9 | 0.09 | 356 | 49.5 | 34 | 184 | B |
| Example 7 | 12 | 1 | 0 | 410 | 50.2 | 40 | 160 | A |
| Example 8 | 4 | 0 | 0 | 350 | 48.9 | 32 | 155 | B |
| Example 9 | 5 | 0.2 | 0 | 379 | 48.8 | 40 | 170 | B |
| Comparative Example 1 | 10 | 8 | 0 | 130 | 52.0 | 16 | 260 | C |
| Comparative Example 2 | 0 | 0 | 0.10 | 102 | 52.0 | 8 | 65 | C |
| Comparative Example 3 | 3 | 0 | 0.20 | 112 | 49.0 | 12 | 150 | C |
| Comparative Example 4 | 4 | 0.2 | 0 | 120 | 48.9 | 11 | 170 | C |
| Comparative Example 5 | 2 | 0.2 | 0 | 110 | 48.8 | 6 | 180 | C |
| Comparative Example 6 | 2 | 1.2 | 0.60 | 160 | 47.0 | 18 | 70 | C |

From the results shown in Table 2, in each of the aluminum alloy wire rods, the correlations between the various conditions related to the voids, the Fe-based compound particles or the like and the evaluated characteristics can be found. The following are elucidated. Each of the aluminum alloy wire rods of Examples 1 to 9 exhibited a high conductivity and a moderate low yield strength, and also exhibited a high vibration resistance and a high bending fatigue resistance.

In contrast, in Comparative Example 1, since the Fe content is greater than the range of the present disclosure, both of the vibration resistance and the bending fatigue resistance were poor, the numerical value of the 0.2% yield was large and the ease of routing and handling of an electric wire was poor. In Comparative Example 2, since the Fe content is smaller than the range of the present disclosure, large crystal grains having diameters greater than or equal to half the wire size were present, and both of the vibration resistance and the bending fatigue resistance were poor. In any one of Comparative Examples 3 to 5, since the line tension immediately before winding up was 53 to 60 N to be greater than 50 N, the presence ratio of the voids each having an area greater than 20 µm$^2$ shown in Table 2 was 2 to 3 voids/1000 µm$^2$ to fall outside the range of the present disclosure, both of the vibration resistance and the bending fatigue resistance were poor. In Comparative Example 6 performed under the conditions corresponding to the present example 1 of the Japanese Patent No. 5607853, since the line tension immediately before winding up was 70 N to be greater than 50 N, and the presence ratio of the voids each having an area greater than 20 µm$^2$ shown in Table 2 was two voids/1000 µm$^2$ to fall outside the range of the present disclosure, both of the vibration resistance and the bending fatigue resistance were poor. Moreover, as shown in FIGS. 2A and 2B for the SEM images of the conventional aluminum alloy wire rods and FIG. 3 for the SEM image of the aluminum alloy wire rod as an example of the present embodiment, in the aluminum alloy wire rods subjected to wire drawing by the conventional manufacturing method, voids were generated in the vicinities of the coarse Fe-based compound particles each having an area greater than 4 µm$^2$. On the other hand, in the aluminum alloy wire rods subjected to wire drawing by the manufacturing method according to the present disclosure, although the Fe-based compound particles were present, no coarse Fe-based compound particles each having an area greater than 4 μm² were present, no voids were generated in the vicinities of the fine Fe-based compound particles present in the wire rods, and thus, the wire drawing performed by the manufacturing method of the present disclosure suppressed the formation of voids in the vicinities of the fine Fe-based compound particles.

INDUSTRIAL APPLICABILITY

The aluminum alloy wire rod of the present disclosure is based on the premise that an aluminum alloy containing Mg and Si is used, is capable of improving the ease of routing and handling of an electric wire while ensuring a high conductivity and a high level yield strength even when used as a small-diameter wire having a strand diameter of less than or equal to 0.5 mm, and additionally can achieve both of a high vibration resistance and a high bending fatigue resistance. Accordingly, the aluminum alloy wire rod of the present disclosure is useful as a battery cable, a wire harness or a conducting wire for a motor, equipped on a transportation vehicle, and as a wiring structure of an industrial robot. Moreover, since the aluminum alloy wire rod of the present disclosure has a high bending fatigue resistance, the wire size thereof can be made smaller than those of conventional wires. Since the aluminum alloy wire rod of the present disclosure can achieve both of a high vibration resistance and a high bending fatigue resistance, one type of the aluminum alloy wire rod of the present disclosure can be applied to various positions; thus the same wire rod can be used in positions undergoing different strains such as a door portion and an engine portion, and accordingly the aluminum alloy wire rod of the present disclosure is extremely useful as the components for mass-produced vehicles and the like from the viewpoint of the standardization of parts.

What is claimed is:

1. An aluminum alloy wire rod comprising Mg: 0.1 mass % to 1.0 mass %, Si: 0.1 mass % to 1.2 mass %, Fe: 0.10 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities, wherein in a cross section parallel to a wire rod lengthwise direction and including a center line of the wire rod, no void having an area greater than 20 μm² is present, or even in a case where at least one void having an area greater than 20 μm² is present, a presence ratio of the at least one void per 1000 μm² is on average in a range of less than or equal to one void/1000 μm².

2. The aluminum alloy wire rod according to claim 1, wherein in the cross section, no void having an area greater than 1 μm² is present, or even in a case where at least one void having an area greater than 1 μm² is present, a presence ratio of the at least one void per 1000 μm² is on average in a range of less than or equal to one void/1000 μm².

3. The aluminum alloy wire rod according to claim 1, wherein in the cross section, no Fe-based compound particle having an area of greater than 4 μm² is present, or even in a case where at least one Fe-based compound particle having an area of greater than 4 μm² is present, a presence ratio of the at least one Fe-based compound particles per 1000 μm² is on average in a range of less than or equal to one particle/1000 μm².

4. The aluminum alloy wire rod according to claim 1, wherein in the cross section, a presence ratio of at least one Fe-based compound particle having an area of 0.002 to 1 μm² is on average in a range of greater than or equal to one particle/1000 μm².

5. The aluminum alloy wire rod according to claim 1, wherein in a case where at least 1000 crystal grains are observed in a metal structure, an average presence probability of at least one crystal grain having a maximum dimension in the diameter direction of the wire rod that is greater than or equal to half of the diameter of the wire rod is less than 0.10%.

6. The aluminum alloy wire rod according to claim 1, wherein number of cycles of vibration to fracture is greater than or equal to 2,000,000 cycles, number cycles of bending to fracture is greater than or equal to 200,000 cycles and conductivity is greater than or equal to 40% IACS.

7. The aluminum alloy wire rod according to claim 1, wherein the aluminum alloy wire rod comprises both of or any one of Ti: 0.001 mass % to 0.100 mass % and B: 0.001 mass % to 0.030 mass %.

8. The aluminum alloy wire rod according to claim 1, wherein the aluminum alloy wire rod comprises at least one of Cu: 0.01 mass % to 1.00 mass %, Ag: 0.01 mass % to 0.50 mass %, Au: 0.01 mass % to 0.50 mass %, Mn: 0.01 mass % to 1.00 mass %, Cr: 0.01 mass % to 1.00 mass %, Zr: 0.01 mass % to 0.50 mass %, Hf: 0.01 mass % to 0.50 mass %, V: 0.01 mass % to 0.50 mass %, Sc: 0.01 mass % to 0.50 mass %, Co: 0.01 mass % to 0.50 mass % and Ni: 0.01 mass % to 0.50 mass %.

9. The aluminum alloy wire rod according to claim 1, wherein the aluminum alloy wire rod comprises Ni: 0.01 mass % to 0.50 mass %.

10. The aluminum alloy wire rod according to claim 1, wherein a sum of contents of Fe, Ti, B, Cu, Ag, Au, Mn, Cr, Zr, Hf, V, Sc, Co and Ni is 0.10 mass % to 2.00 mass %.

11. The aluminum alloy wire rod according to claim 1, wherein the aluminum alloy wire rod is an aluminum alloy wire having a strand diameter of 0.1 mm to 0.5 mm.

12. An aluminum alloy stranded wire obtained by stranding a plurality of the aluminum alloy wires as claimed in claim 11.

13. A covered wire comprising a covering layer at an outer periphery of one of the aluminum alloy wire as claimed in claim 11.

14. A wire harness comprising:

a covered wire including a covering layer at an outer periphery of one of an aluminum alloy wire rod and an aluminum alloy stranded wire; and a terminal fitted at an end portion of the covered wire, the covering layer being removed from the end portion, wherein the aluminum alloy wire rod comprises Mg: 0.1 mass % to 1.0 mass %, Si: 0.1 mass % to 1.2 mass %, Fe: 0.10 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities, wherein in a cross section parallel to a wire rod lengthwise direction and including a center line of the wire rod, no void having an area greater than 20 μm$^2$ is present, or even in a case where at least one void having an area greater than 20 μm$^2$ is present, a presence ratio of the at least one void per 1000 μm$^2$ is on average in a range of less than or equal to one void/1000 μm$^2$.

15. A method of manufacturing an aluminum alloy wire rod comprising:

forming a drawing stock through hot working subsequent to melting and casting an aluminum alloy material having a composition comprising Mg: 0.1 mass % to 1.0 mass %, Si: 0.1 mass % to 1.2 mass %, Fe: 0.10 mass % to 1.40 mass %, Ti: 0 mass % to 0.100 mass %, B: 0 mass % to 0.030 mass %, Cu: 0 mass % to 1.00 mass %, Ag: 0 mass % to 0.50 mass %, Au: 0 mass % to 0.50 mass %, Mn: 0 mass % to 1.00 mass %, Cr: 0 mass % to 1.00 mass %, Zr: 0 mass % to 0.50 mass %, Hf: 0 mass % to 0.50 mass %, V: 0 mass % to 0.50 mass %, Sc: 0 mass % to 0.50 mass %, Co: 0 mass % to 0.50 mass %, Ni: 0 mass % to 0.50 mass %, and the balance: Al and inevitable impurities; and subsequently, performing steps including at least a wire drawing step, a solution heat treatment and an aging heat treatment, wherein in the wire drawing step, wire drawing is performed with a maximum line tension of 50 N or less until a wire size of the wire rod reaches a final wire size from a wire size of twice the final wire size to the final wire size;

the solution heat treatment includes heating at a predetermined temperature in a range of 450° C. to 580° C., retaining at the predetermined temperature for a predetermined time, and thereafter cooling at an average cooling rate of greater than or equal to 10° C./s to at least a temperature of 150° C.; and the aging heat treatment includes heating at a predetermined temperature of 20° C. to 250° C.

16. The method of manufacturing an aluminum alloy wire rod according to claim 15, wherein an average cooling rate from the molten metal temperature to 400° C. in the casting is 20° C./sec to 50° C./sec; a re-heat treatment is performed after the casting and before the wire drawing process; and the re-heat treatment includes a heating at a predetermined temperature of higher than or equal to 400° C., and a retaining at the predetermined temperature for a period of time of less than or equal to 30 minutes.

17. A covered wire comprising a covering layer at an outer periphery of the aluminum alloy stranded wire as claimed in claim 12.

* * * * *